United States Patent [19]

Matsuoka et al.

[11] Patent Number: 4,977,507
[45] Date of Patent: Dec. 11, 1990

[54] MOTOR-DRIVEN POWER STEERING CONTROL APPARATUS

[75] Inventors: Hirofumi Matsuoka; Hidetoshi Tabuse, both of Osaka, Japan

[73] Assignee: Koyo Seiko Co., Ltd., Osaka, Japan

[21] Appl. No.: 399,722

[22] Filed: Aug. 28, 1989

[30] Foreign Application Priority Data

Sep. 6, 1988 [JP] Japan .................................. 63-222895
Feb. 28, 1989 [JP] Japan ...................................... 1-49340

[51] Int. Cl.[5] .............................................. B62D 5/04
[52] U.S. Cl. .............................. 364/424.05; 180/79.1; 180/142
[58] Field of Search .................. 364/424.05; 180/79.1, 180/140, 141, 142, 143; 318/430, 432, 434, 471

[56] References Cited

U.S. PATENT DOCUMENTS

| 4,467,260 | 8/1984 | Mallick, Jr. et al. ................ 318/434 |
| 4,754,828 | 7/1988 | Morishita et al. .............. 364/424.05 |
| 4,771,843 | 9/1988 | Shimizu .............................. 180/142 |
| 4,771,845 | 9/1988 | Shimizu ............................. 180/79.1 |
| 4,789,040 | 12/1988 | Morishita et al. .................... 180/142 |

FOREIGN PATENT DOCUMENTS 62-255274 11/1987 Japan .

*Primary Examiner*—Gary Chin
*Attorney, Agent, or Firm*—Townsend and Townsend

[57] ABSTRACT

The motor-driven power steering control apparatus of the invention detects overload of a motor according to the calculation of coil resistance and temperature detection based thereon. The coil resistance is calculated according to terminal voltage or effective voltage based on duty ratio, and counter-electromotive force, and the driving current. Thereby overload of the motor can be detected without delay.

6 Claims, 4 Drawing Sheets

MOTOR-DRIVEN POWER STEERING CONTROL APPARATUS

BACKGROUND OF THE INVENTION

1. Field of the Invention

This invention relates to a motor-driven power steering control apparatus assisting steering force by an electric motor. More particularly, the invention relates to a motor-driven power steering control apparatus for detecting overload of the electric motor without delay.

2. Description of Related Art

When a vehicle such as a car is stopped or running at a low speed, an enormous amount of power is required in order to operate the steering wheel. A power steering apparatus, assisting steering force with an electric motor in order to reduce steering force required for a driver, is well known. (Japanese Patent Application Laid-Open No. 60-35663)

The aforementioned electric motor is provided in a narrow space in an engine compartment in which heat is generated. The ambient temperature thereof is very high by calorification of an engine.

As explained above, the electric motor assisting steering force is frequently exposed to high temperature, as the working environment is not ideal. In such a working environment, in order not to burn the electric motor, the one whose output and application temperature has some tollerance may be used. But in that case, the electric motor itself is enlarged to require a wide fixing space, so it is impossible to fix, and results in great expense. Therefore, in the case where a small-sized electric motor is used, it is considered that current supply time to the motor and current value thereof are calculated and overload thereof is detected and the electric motor is protected. But, in this case, there is a problem that a difference of the detected overload occurs between initial driving and driving after a specified time of the electric motor. On the other hand, independently of the above case, it is considered that a temperature sensor for detecting the temperature of the electric motor is provided thereon, however, in this case, there is a problem that the overload state cannot be detected immediately and properly because of a delay of operation of the temperature sensor.

SUMMARY OF THE INVENTION

This invention has been devised in consideration of the above circumstances, and the primary object thereof is to provide a motor-driven power steering control apparatus for detecting overload state of an electric motor immediately and accurately by calculating a coil resistance on the basis of driving current, counter-electromotive force, and terminal voltage of the electric motor, thereby detecting temperature of the electric motor without delay.

Another object of the present invention is to provide a motor-driven power steering control apparatus which can be applied to a small-sized electric motor, protecting the electric motor from overload by reducing the driving current of the electric motor when the overload state is detected.

Still another object of the invention is to provide a motor-driven power steering control apparatus capable of detecting overload of an electric motor without being effected due to a change in battery voltage by calculating coil resistance on the basis of driving current, counter-electromotive force, and effective voltage based on duty ratio, thereby detecting the temperature of the electric motor.

The above and further objects and features of the invention will more fully be apparent from the following detailed description with accompanying drawings.

DESCRIPTION OF THE PREFERRED EMBODIMENTS

In the following, the present invention is to be described in detail referring to drawings showing the embodiments.

Figure 1:
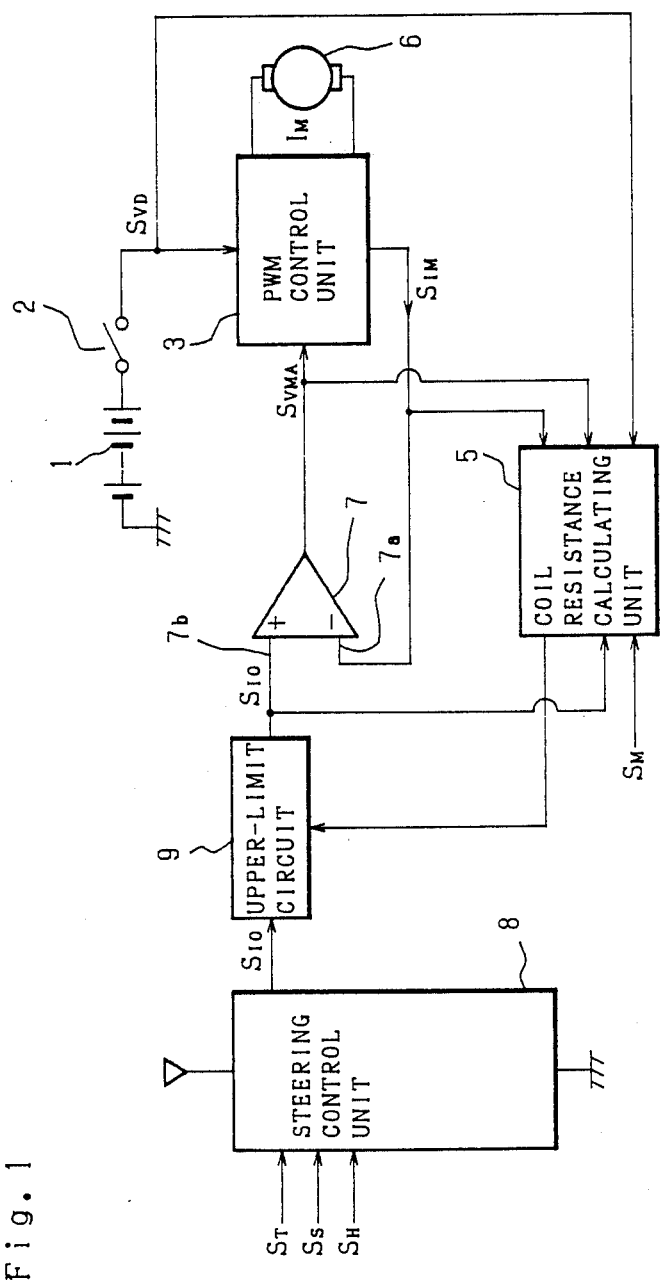
FIG. 1 is a block diagram of a motor-driven power steering control apparatus related to the invention.

FIG. 1 is a block diagram of the main parts of a motor-driven power steering control apparatus related to the invention. A positive electrode of a DC power supply 1 which grounds the negative electrode thereof and consists of battery, is connected to a PWM (pulse width modulation) control unit 3 for controlling driving current of an electric motor to be described later, through a protection switch 2 which opens in the case where abnormal current flows. To this PWM control unit 3, a small-sized electric motor 6 for assisting steering force is connected. The electric motor 6 is driven by a PWM-controlled voltage of required duty ratio. Inside of the PWM control unit 3, a current detecting unit (not shown) consisting of, for example, a shunt resistance is provided for detecting a driving current of the electric motor 6. The PWM control unit 3 transmit a driving current signal $S_{IM}$ related to the driving current detected by the current detecting unit to a negative input terminal $7a$ of a differential amplifier 7 and to a coil resistance calculating unit 5. The differential amplifier 7 transmits a terminal voltage average value signal $S_{VMA}$, which is the output thereof, related to a terminal voltage average value of the electric motor 6 to the PWM control unit 3, and coil resistance calculating unit 5. And a DC voltage signal $S_{VD}$ related to the voltage of DC power supply 1 is given to the coil resistance calculating unit 5.

Input to a steering control unit 8 in which PID-control is performed is a torque signal $S_T$ related to torque which acts upon a steering axis (not shown) due to steering operation, a vehicle speed signal $S_S$ related to driving speed of a vehicle, and a steering angle signal $S_H$ related to rotational quantity of aforesaid steering axis respectively. The steering control unit 8 compensates the given torque signal $S_T$ according to the vehicle speed signal $S_S$ and the steering angle signal $S_H$, and outputs a reference current signal $S_{SIO}$ related to the compensated torque signal $S_T$ and gives it to an upper limit circuit 9.

The upper-limit circuit 9 is capable of reducing the upper-limit value of the given reference current signal $S_{IO}$ according to the output of the coil resistance calculating unit 5. The reference current signal $S_{IO}$ output from the upper-limit circuit 9 is input to positive input terminal $7b$ of the aforesaid differential amplifier 7 and the aforesaid coil resistance calculating unit 5. In addition, to the coil resistance calculating unit 5, a rotary signal $S_M$ related to the detected number of revolutions of the electric motor 6 is given, and the output of the coil resistance calculating unit 5 is given to aforesaid upper-limit circuit 9. The coil resistance calculating unit 5 is capable of calculating a real terminal voltage $V_M$ of the electric motor by compensating the terminal voltage average value signal $S_{VMA}$ according to a voltage variation of the DC power supply 1 based on the given DC voltage signal $S_{VD}$ and the terminal voltage average value signal $S_{VMA}$. The coil resistance calculating unit 5 is also capable of writing into a memory (not shown) inside the coil resistance calculating unit 5 the calculated terminal voltage $V_M$, driving the current $I_M$ of the electric motor 6 due to aforesaid driving current signal $S_{IM}$, and the number of revolutions $N_M$ of the electric motor 6 due to the rotary signal $S_M$ respectively.

Figure 2:
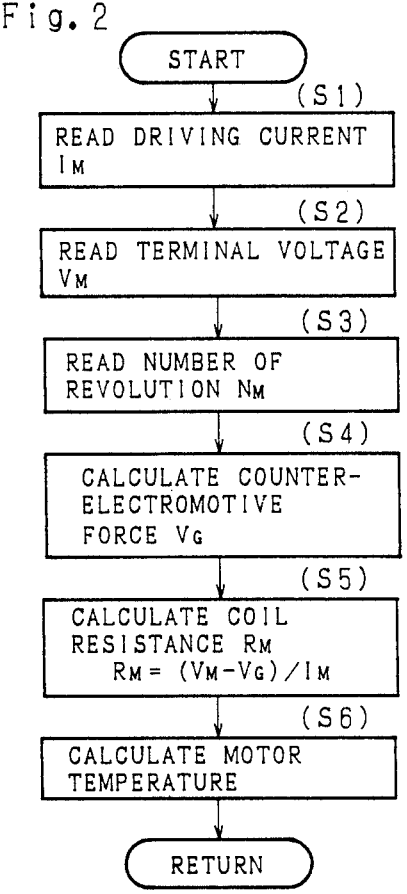
FIG. 2 is a flow chart showing a calculation procedure of coil resistance.

Next, the operation of the motor-driven power steering control apparatus constructed as described above will be explained referring to FIG. 1 and FIG. 2. FIG. 2 is a flow chart showing the calculation procedure of the coil resistance calculating unit 5.

When the vehicle runs, a vehicle speed sensor (not shown) detects the vehicle speed thereof, the vehicle speed signal $S_S$ being given to the steering control unit 8. In the case where the steering wheel (not shown) is operated, torque acted upon the steering axis is detected by a torque sensor (not shown). The torque signal $S_T$ and the steering angle signal $S_H$ related to the rotation quantity of the steering axis are given to the steering control unit 8. Thereby, the steering control unit 8 compensates the given torque signal according to the vehicle speed signal $S_S$ and the steering angle signal $S_H$. In the case, for example, where the vehicle speed or the rotation quantity of the steering axis is more than the specified value, the reference current signal $S_{IO}$ related to the torque signal $S_T$ is not output. And the reference current signal $S_{IO}$ for driving the electric motor 6 which assists steering force is given to the positive input terminal 7b of the differential amplifier 7 and the coil resistance calculating unit 5 through the upper-limit circuit 9. To the coil resistance calculating unit 5, the reference current signal $S_{IO}$ is given, and in the case where the signal is within the predetermined range, the signal to the upper-limit circuit 9 is not output. Therefore, the differential amplifier 7 compares the driving current signal $S_{IM}$ given to the negative input terminal 7a with the reference current signal $S_{IO}$, the output signal related to the difference, that is, the terminal voltage average value signal $S_{VMA}$ of the electric motor 6 being given to the PWM control unit 3. This allows DC voltage $V_D$ of the DC power supply 1 to be PWM controlled, and the PWM controlled voltage of the required duty ratio is supplied to the electric motor 6. The electric motor 6 generates rotational force corresponding to the reference current signal $S_{IO}$, thereby assisting steering force. In addition, when the reference current signal $S_{IO}$ is more than the predetermined value, the coil resistance calculating unit 5 gives the output to the upper-limit circuit 9, thereby reducing the upper-limit value of the reference current signal $S_{IO}$ to reduce the driving current of the electric motor 6. And in the case where the steering operation is stopped, the torque acting upon the steering axis is extinguished, such that the output of the steering control unit 8 is extinguished, and the driving of the electric motor 6 is stopped. When the electric motor 6 is driven, the terminal voltage average value signal $S_{VMA}$, the driving current signal $S_{IM}$, the voltage signal $S_{VD}$ and the rotary signal $S_M$ are respectively given to the coil resistance calculating unit 5. Thereby, prior to the calculating operation of the coil resistance, the coil resistance calculating unit 5 calculates the terminal voltage $V_M$ of the electric motor 6 corresponding to voltage variation of the DC power supply 1 according to the DC voltage signal $S_{VD}$ and the terminal voltage average signal $S_{VMA}$. After that, according to the flow shown in FIG. 2, the coil resistance calculating unit 5 reads the driving current $I_M$ due to the driving current signal $S_{IM}$ and writes it into the memory (not shown) in the coil resistance calculating unit 5 (S1), along with the terminal voltage $V_M$ previously calculated (S2), and the number of revolutions $N_M$ due to the rotary signal $S_M$ (S3). Then, referring to the number of revolutions $N_M$ and the DC voltage $V_D$ due to the DC voltage signal $S_{VD}$, the coil resistance calculating unit 5 calculates counter-electromotive force $V_G$ induced at the coil of the electric motor in the case where the electric motor 6 is driven (S4). Then, according to the terminal voltage $V_M$, counter-electromotive force $V_G$, and driving current $I_M$, it calculates the expression of $(V_M - V_G) / I_M$ to calculate coil resistance $R_M$ of the electric motor 6 (S5). Next, it calculates the temperature of the electric motor 6 according to the coil resistance $R_M$ so calculated as above and the temperature coefficient of the coil resistance (S6). And in the case where the calculated temperature of the electric motor 6 reaches the predetermined value, the coil resistance calculating unit 5 generates output to be given to the upper-limit circuit 9. Then, the upper limit circuit 9 reduces the upper-limit value of the reference current signal $S_{IO}$ given from the steering control unit 8. The reference current signal $S_{IO}$ is given to the differential amplifier 7, the terminal voltage average value signal $S_{VMA}$, being the output thereof, being reduced. Thereby PWM control is executed to reduce the driving current $I_M$ of the electric motor 6, and the electric motor 6 whose temperature is too high is protected from overload.

In calculating the temperature of the electric motor, the counter-electromotive force $V_G$ induced by driving the electric motor 6 is subtracted from the terminal voltage $V_M$ of the electric motor 6. Then the subtracted terminal voltage is divided by the driving current $I_M$ to calculate coil resistance $R_M$, thereby calculating coil temperature of the electric motor 6. Therefore, the temperature of the electric motor 6 can be calculated accurately without delay. Accordingly, the electric motor 6 can be protected from overload immediately and accurately, and a small-sized electric motor can be applied to the motor-driven power steering, the reliability of the protection for the electric motor being improved.

As described above, according to the present invention, at either the initial driving or after the driving, the overload of the electric motor can be detected accurately and without delay. Accordingly, a small-sized electric motor used for the motor-driven power steering can be realized which is capable of protecting the electric motor from overload properly.

Next, an explanation will be given of another embodiment. In the aforesaid embodiment, an explanation is given of the motor-driven power steering control apparatus which is capable of using a small-sized electric motor by detecting respectively driving current, terminal voltage, and number of revolutions of the electric motor for assisting steering force, and thereby calculating coil resistance of the electric motor to calculate temperature of the electric motor 6. By reducing driving current of the electric motor when the calculated temperature reaches the predetermined value, the electric motor is protected from overload. In the aforesaid embodiment, however, sometimes overload cannot be detected accurately in the case where the terminal voltage of the electric motor is effected by the battery voltage. In this embodiment, in place of the terminal voltage, overload is detected by effective voltage. Overload is detected without being effected by the variation of the battery voltage.

Figure 3:
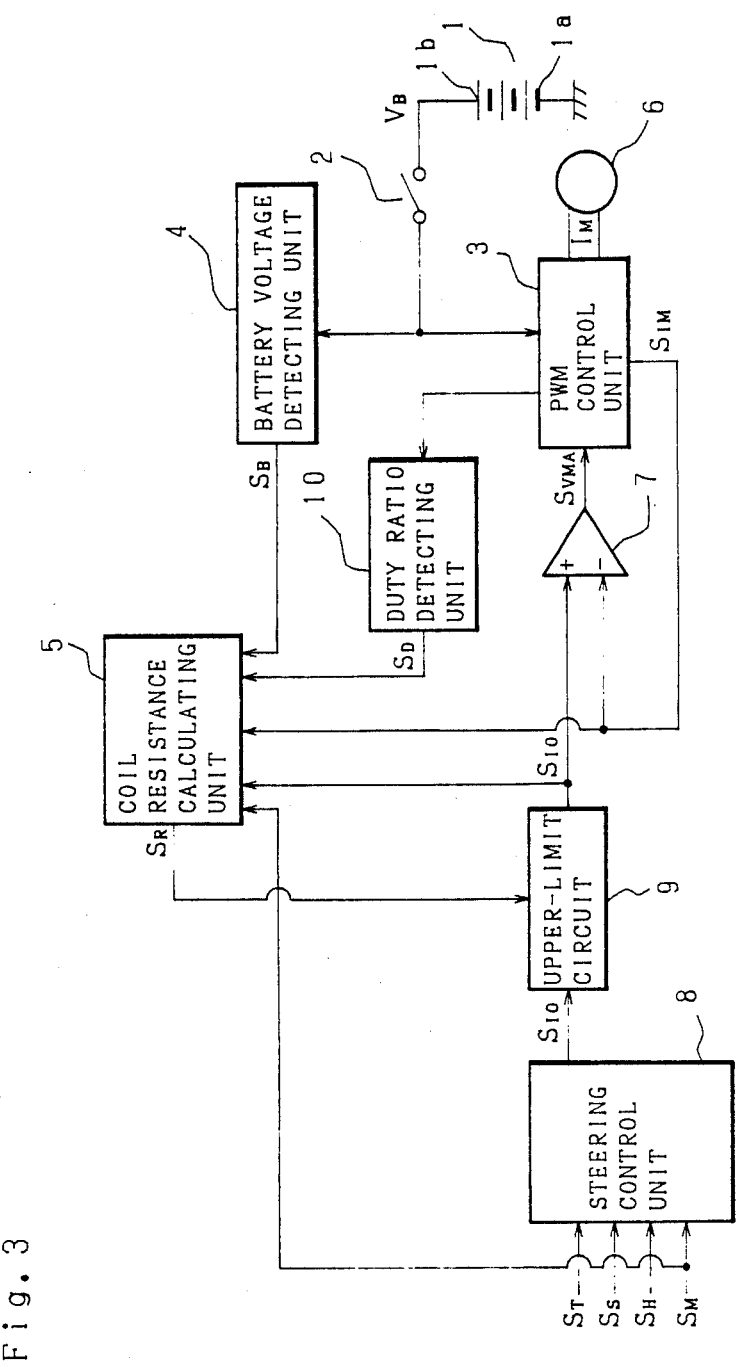
FIG. 3 is a block diagram of the main parts of a motor-driven power steering control apparatus of another embodiment of the invention.

FIG. 3 is a block diagram of the main parts of the motor-driven power steering control apparatus of another embodiment. The positive voltage of the battery 1 whose negative electrode is grounded is given to the PWM (pulse width modulation) control unit 3 for controlling the driving current of the electric motor to be described later and the battery voltage detecting unit 4 through protective switch 2 which opens in the case where abnormal current flows. The DC voltage signal $S_B$ related to the terminal voltage of the battery detected by the battery voltage detecting unit 4 is given to the coil resistance calculating unit 5 for calculating the coil resistance of the electric motor. At PWM control unit 3, a small-sized electric motor 6 for assisting steering force is connected. The electric motor 6 is driven by PWM controlled voltage due to a required duty ratio. And the PWM signal of the PWM control unit 3 is also given to a duty ratio detecting unit 10. The duty ratio signal $S_D$ detected by the duty ratio detecting unit 10 is given to the coil resistance calculating unit 5. Inside of this PWM control unit 3, an electric current detecting unit (not shown) consisting of, for example, a shunt resistance is provided for detecting a driving current of the electric motor 6. The driving current signal $S_{IM}$ related to the driving current detected by the electric current detecting unit is given respectively to the coil resistance calculating unit 5 and the negative input terminal— of the differential amplifier 7.

Input to the steering control unit 8 is the torque signal $S_T$ related to torque acted upon the steering axis (not shown) by steering operation, the vehicle speed signal $S_S$ related to driving speed of the vehicle, the steering angle signal $S_H$ related to the rotation quantity of aforesaid steering axis and the rotary signal $S_M$ related to the rotation speed of the electric motor 6 respectively. The rotary signal $S_M$ is given to the coil resistance calculating unit 5. The steering control unit 8 compensates the given torque signal $S_T$ by the vehicle speed signal $S_S$ and the steering angle signal $S_H$. The reference current signal $S_{IO}$, related to the compensated torque signal $S_T$, is output to the upper-limit circuit 9.

The upper-limit circuit 9 is capable of reducing the upper-limit value of the reference current signal $S_{IO}$ given thereto, according to the output signal $S_R$ of the coil resistance calculating unit 5. The reference current signal $S_{IO}$ output from the upper-limit circuit 9 is given to the positive input terminal + of the aforesaid differential amplifier 7 and the coil resistance calculating unit 5. The output signal $S_R$ of the coil resistance calculating unit 5 is given to the upper-limit circuit 9. The coil resistance calculating unit 5 does not output the output signal $S_R$ in the case where the given reference current signal $S_{IO}$ is below the predetermined value. The coil resistance calculating unit 5 is so constructed as to calculate effective voltage $V_E$ of the electric motor 6 according to the DC voltage signal $S_B$ given to the calculating unit 5 and the duty ratio signal $S_D$ of the PWM control unit 3. The calculated effective voltage $V_E$, the driving current $I_M$ of the electric motor 6 due to the driving current signal $S_{IM}$, and the number of revolutions $N_M$ of the electric motor 6 due to the rotary signal $S_M$ are respectively stored in memories (not shown) inside the coil resistance calculating unit 5.

Figure 4:
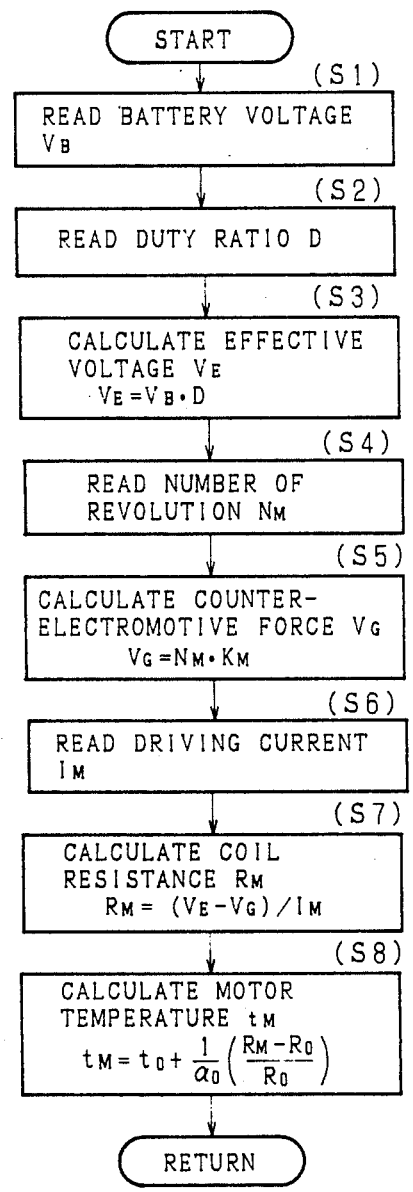
FIG. 4 is a flow chart showing calculation procedure of coil resistance of another embodiment.

Next, explanation will be given on the operation of the motor-driven power steering control apparatus so constructed as above referring to FIG. 4. FIG. 4 is a flow chart showing the calculating procedure of the coil resistance calculating unit 5.

When a vehicle runs, a vehicle speed sensor (not shown) detects the vehicle speed, and the vehicle speed signal $S_S$ thereof is given to the steering control unit 8. When a steering wheel (not shown) is operated, torque acted upon the steering axis is detected by the torque sensor (not shown), and the torque signal $S_T$ thereof and the steering angle signal $S_H$ related to the rotation quantity of the steering axis are given to the steering control unit 8. Thereby, the steering control unit 8 compensates the given torque signal $S_T$ according to the vehicle speed signal $S_S$ and the steering angle signal $S_H$. For example, in the case where the vehicle speed or the rotation quantity of the steering axis is more than predetermined value, the reference current signal $S_{IO}$ related to the torque signal $S_T$ is not output. And the reference current signal $S_{IO}$ for driving the electric motor 6 assisting the steering force is given to the positive input terminal + of the differential amplifier 7 and the coil resistance calculating unit 5 through the upper-limit circuit 9. To the coil resistance calculating unit 5, the reference current signal $S_{IO}$ is input, and in the case where the signal is below the predetermined value, it does not output the output signal $S_R$ to the upper-limit circuit 9. Therefore, the differential amplifier 7 compares the driving current signal $S_{IM}$ given to the negative input terminal—thereof with the reference current signal $S_{IO}$, and gives the output signal related to the difference, that is, the terminal voltage average value signal $S_{VMA}$ of the electric motor 6 to the PWM control unit 3. Then the voltage $V_B$ of the battery 1, given to the PWM control unit 3, is PWM controlled, and the voltage with the required duty ratio is given to the electric motor 6, and the electric motor 6 generates the turning force corresponding to the reference current signal $S_{IO}$ and assists the steering force. In addition, when the reference current signal $S_{IO}$ is more the predetermined value, the coil resistance calculating unit 5 gives the output signal $S_R$ to the upper-limit circuit 9 to reduce the upper-limit value of the reference current signal $S_{IO}$, thereby reducing the driving current $I_M$ of the electric motor 6. In the case where the steering operation is stopped, the torque acting upon the steering axis is extinguished causing the reference current signal $S_{IO}$ outputted from the steering control unit 8 to be extinguished and the driving of the electric motor 6 to be stopped. By the way, in the case where the electric motor 6 is driven, the duty ratio signal $S_D$ for PWM controlling, the driving current signal $S_{IM}$, the DC voltage signal $S_B$ and the rotary signal $S_M$ are respectively given to the coil resistance calculating unit 5. According to the flow shown in FIG. 4, the battery voltage $V_B$ is read and written into the memory (not shown) in the coil resistance calculating unit 5 (S1). Next the duty ratio D of the battery voltage $V_B$ for PWM controlling (S2) is read. According to the battery voltage $V_B$ and the duty ratio D, the effective voltage $V_E$ of the electric motor 6 is calculated by $V_B \times D$ (S3). Next, according to the rotary signal $S_M$, the number of revolutions $N_M$ of the electric motor 6 is read and written into the memory (S4), and according to the number of revolutions $N_M$ and voltage generation coefficient $K_M$ previously stored in the coil resistance calculating unit 5, the counter-electromotive force $V_G$ of the electric motor 6 is calculated by $V_G = N_M \times K_M$ (S5). Next, according to the driving current signal $S_{IM}$, the driving current $I_M$ of the electric motor 6 is read and written into the memory of the coil resistance calculating unit 5 (S6). According to the driving current $I_M$, the effective voltage $V_E$ of the electric motor 6 and the counter-electromotive force $V_G$ of the electric motor 6, the coil resistance $R_M$ of the electric motor 6 is calculated by $R_M = (V_E - V_G) / I_M$ (S7). Next, according to the calculated coil resistance $R_M$ of the electric motor 6, the coil resistance $R_0$ at the temperature $t_0$ previously memorized at the coil resistance calculating unit 5, and the temperature coefficient $\alpha_0$ of the coil resistance at the temperature $T_0$, the temperature $t_M$ of the electric motor 6 is calculated from $t_M = t_0 + (1/\alpha_0)\{(R_M - R_0)/R_0\}$ (S8). And in the case where the calculated temperature $t_M$ of the electric motor reaches the predetermined value, that is, the electric motor 6 is in the state of overload, the coil resistance calculating unit 5 outputs the output signal $S_R$ to be given to the upper-limit circuit 9. The upper-limit circuit 9 reduces the upper-limit value of the reference current signal $S_{IO}$ given from the steering control unit 8. The reference current signal $S_{IO}$ is given to the differential amplifier 7 and the terminal voltage average value signal $S_{VMA}$, which is the output thereof, is reduced, causing the battery voltage $V_B$ being PWM controlled to reduce the driving current $I_M$ of the electric motor 6. The steering force is assisted to protect the electric motor 6 whose temperature has risen from overload.

In calculating the temperature of the electric motor, the effective voltage $V_E$ of the electric motor is calculated according to the battery voltage $V_B$ of the battery for driving the electric motor and the duty ratio D of the voltage age to be given to the electric motor for PWM controlling. The value obtained by subtracting the counter-electromotive force $V_G$ of the electric motor from the calculated effective voltage $V_E$, is divided by the driving current $I_M$ of the electric motor to calculate the coil resistance $R_M$ of the electric motor and the temperature of the electric motor. Therefore, the calculation of the temperature $t_M$ of the electric motor is not effected by the voltage variation of the battery, and can be calculated immediately. Accordingly, overload of the electric motor assisting the steering force can be detected properly regardless of the voltage variation of the battery, thereby protecting the electric motor. Therefore, a small-sized electric motor can be used to the motor-driven power steering, and the reliability for protecting the electric motor can be improved.

As explained above, according to this embodiment, even if voltage variation of the DC supply which drives the electric motor assisting the steering force is created, the apparatus is not effected, and the overload of the electric motor can be detected accurately and immediately to control the driving current of the electric motor. Thereby, a small-sized electric motor can be used which is always surely protected from overload.

Accordingly, a motor-driven power steering control apparatus which has high reliability and is inexpensive can be obtained.

As this invention may be embodied in several forms without departing from the spirit of essential characteristics thereof, the present embodiment is illustrative and not restrictive. The scope of the invention is defined by the appended claims rather than by the description preceding them, and all changes that fall within the metes and bounds of the claims, or equivalence of such metes and bounds thereof are therefore intended to be embraced by the claims.

What is claimed is:

1. An apparatus for detecting an overload on an electric motor used to assist steering force in a motor-driven power assisted steering control system, comprising:
    means for detecting driving current of said electric motor;
    means for detecting terminal voltage of said electric motor;
    means for detecting a number of revolutions of said electric motor;
    counter-electromotive force calculating means for calculating counter-electromotive force of said electric motor on the basis of the detected number of revolutions;
    resistance calculating means for calculating coil resistance of said electric motor by using the detected driving current, terminal voltage and calculated counter-electromotive force;
    temperature calculating means for calculating temperature of the electric motor on the basis of the calculated coil resistance wherein the calculated temperature is interrupted to determine whether said overload exists; and electric current control means for reducing said driving current of said electric motor when the calculated temperature reaches a predetermined value indicative of the existence of said overload.

2. A motor-driven power steering control apparatus as set forth in claim 1, wherein said counter-electromotive force calculating means calculates counter-electromotive force according to a multiplication of the detected number of revolutions and predetermined voltage generation coefficient.

3. A motor-driven power steering control apparatus as set forth in claim 1, wherein said resistance calculating means calculates said coil resistance by subtracting the calculated counter-electromotive force from the detected terminal voltage and dividing the subtracted result by the detected driving current.

4. An apparatus for detecting an overload on an electric motor used to assist steering force in a motor-driven power assisted steering control system, comprising,
    means for detecting voltage of power source for driving said electric motor;
    driving control means for driving said electric motor by pulse width modulated voltage;
    means for detecting duty ratio of voltage to be given to said electric motor from said driving control means;
    means for detecting driving current of said electric motor;
    means for detecting number of revolutions of said electric motor;
    means for calculating effective voltage of said electric motor on the basis of the detected voltage and the duty ratio;

counter-electromotive force calculating means for calculating a counter-electromotive force of said electric motor on the basis of the detected number of revolutions;

resistance calculating means for calculating coil resistance of said electric motor by using the detected driving current, calculated effective voltage, and the calculated counter-electromotive force; and temperature calculating means for calculating temperature of the electric motor on the basis of the calculated coil resistance wherein the calculated temperature is interrupted to determine whether said overload exists; and electric current control means for reducing said driving current of said electric motor when the calculated temperature reaches a predetermined value indicative of the existence of said overload.

5. A motor-driven power steering control apparatus as set forth in claim 4, wherein said counter-electromotive force calculating means calculates the counter-electromotive force by a multiplication of the detected number of revolutions and predetermined voltage generation coefficient.

6. A motor-driven power steering control apparatus as set forth in claim 4, wherein said resistance calculating means calculates the coil resistance by subtracting the calculated counter-electromotive force from the calculated effective voltage and dividing the subtracted result by the detected driving current.

* * * * *